(12) United States Patent
Yeh et al.

(10) Patent No.: US 7,979,499 B2
(45) Date of Patent: Jul. 12, 2011

(54) COMPOSING, BROWSING, REPLYING, FORWARDING E-MAIL

(75) Inventors: James Yeh, Chengdu (CN); Li Ping Yang, Chengdu (CN); Lei Zhang, Chengdu (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/547,523

(22) Filed: Aug. 26, 2009

(65) Prior Publication Data

US 2009/0319631 A1   Dec. 24, 2009

Related U.S. Application Data

(62) Division of application No. 10/358,456, filed on Feb. 4, 2003, now Pat. No. 7,676,545.

(30) Foreign Application Priority Data

Feb. 5, 2002   (CN) .............................. 2002 1 03528

(51) Int. Cl.
*G06F 15/16* (2006.01)
*G06F 15/173* (2006.01)

(52) U.S. Cl. ....................................... 709/206; 709/224

(58) Field of Classification Search .................. 709/206, 709/207, 223, 224
See application file for complete search history.

(56) References Cited

U.S. PATENT DOCUMENTS

| | | | |
|---|---|---|---|
| 5,706,434 A | 1/1998 | Kremen et al. | |
| 5,754,778 A | 5/1998 | Shoujima | |
| 5,765,178 A | 6/1998 | Tanaka | |
| 5,844,969 A | 12/1998 | Goldman et al. | |
| 5,890,163 A | 3/1999 | Todd | |
| 5,930,471 A * | 7/1999 | Milewski et al. | 709/204 |
| 5,958,005 A * | 9/1999 | Thorne et al. | 709/202 |
| 5,991,810 A * | 11/1999 | Shapiro et al. | 709/229 |
| 6,058,435 A | 5/2000 | Sassin et al. | |
| 6,076,101 A | 6/2000 | Kamakura et al. | |
| 6,101,548 A | 8/2000 | Okada | |
| 6,112,227 A | 8/2000 | Heiner | |
| 6,134,582 A | 10/2000 | Kennedy | |
| 6,708,205 B2 | 3/2004 | Sheldon et al. | |
| 6,721,784 B1 | 4/2004 | Leonard et al. | |
| 6,938,065 B2 | 8/2005 | Jain | |
| 7,596,604 B2 * | 9/2009 | Kawakami et al. | 709/206 |
| 2002/0032743 A1 | 3/2002 | Lee | |
| 2002/0091772 A1 | 7/2002 | Yong | |
| 2008/0086695 A1 * | 4/2008 | Oral | 715/752 |

FOREIGN PATENT DOCUMENTS

WO     0208985 A1     1/2002

* cited by examiner

*Primary Examiner* — Hussein A Elchanti

(74) *Attorney, Agent, or Firm* — Cantor Colburn LLP; Vazken Alexanian

(57) ABSTRACT

Method for composing, browsing, replying, forwarding e-mail's in an e-mail system and an e-mail client that can reduce e-mail traffic by not sending the original e-mail content in replying or forwarding e-mail's. In accordance with this invention, each e-mail has a Global-ID and each reply e-mail has a Reply-to-ID which corresponds to the Global-ID of the original e-mail, thereby the content of the original e-mail is not contained in the reply e-mail. During browsing e-mail's, the original e-mail is retrieved from repositories which stores sent and received e-mail's, and is incorporated into the browsed e-mail.

2 Claims, 7 Drawing Sheets

COMPOSING, BROWSING, REPLYING, FORWARDING E-MAIL

CROSS-REFERENCE TO RELATED APPLICATIONS AND PRIORITY

This application is a divisional of U.S. patent application Ser. No. 10/358,456, filed Feb. 4, 2003, which claims priority to Chinese Patent Application CN02103528.8, with Chinese filing date of Feb. 5, 2002, and all the benefits accruing therefrom under 35 U.S.C. §119, the contents of which in its entirety are herein incorporated by reference.

FIELD OF THE INVENTION

The present invention relates to the communication among computing apparatuses on a network. It is more specifically directed to reducing e-mail traffic in transportation.

BACKGROUND OF THE INVENTION

E-mail is currently one of the most popular applications in computer network. Especially with the development of Internet, e-mail has become one part of people's daily life and an important means of business communication. Therefore, in the traffic of the whole computer network, transporting information of e-mail's occupies a considerable proportion.

In order to make full use of the limited network bandwidth resources, people have proposed a lot of methods to reduce e-mail traffic, for example, compressing e-mail content, etc. For example, U.S. Pat. No. 6,112,227 entitled "FILTER-IN METHOD FOR REDUCING JUNK E-MAIL" by Jeffrey Nelson Heiner, filed on Aug. 6, 1998 and issued on Aug. 29, 2000, has disclosed a method for filtering junk e-mail's, thereby reducing the burden of network traffic and eliminating the burden of the unexpected junk e-mail's for e-mail users. The content thereof is incorporated for reference.

However, during the communicating process of using e-mail's, it always generates a reply-chain: provided that, sending an e-mail e1 from user A to user B, and user B replying user A with an e-mail e2, then the e-mail e2 received by user A containing the whole content of e-mail e1. In fact, e1 has been in the computer of user A. Thereby it causes the waste of time for transporting e-mail's and memory devices. If user A replies the e-mail e2, with the increase of times of to-and-fro in the reply-chain, the waste thereof will exponentially increase. It is well known that the reply-chain universally exist in the communicating process of using e-mail's and the times of to-and-fro in the reply-chain is very large. Therefore, there is a need to develop a method and apparatus to decrease the waste.

SUMMARY OF THE INVENTION

It is the aspect of the present invention to provide methods and apparatus for browsing, composing, replying e-mail's and an e-mail client in an e-mail system to achieve the effect that a reply e-mail receiver can see the previous e-mail of the reply e-mail without attaching the previous e-mail to the reply e-mail.

Thus, the present invention provides methods and apparatus for composing a new e-mail in an e-mail system, comprising the following steps: composing a new e-mail by a user; generating a Global-ID and designating the Global-ID to the present e-mail; and sending and storing the new e-mail.

The present invention further provides methods and apparatus for replying to a received e-mail in an e-mail system, said received e-mail contains a Global-ID, said method comprises the following steps: replying to a received e-mail by a user and creating a reply e-mail; generating a Global-ID and designating the Global-ID to the reply e-mail; designating a Reply-to-ID to the reply e-mail, said Reply-to-ID corresponding to the Global-ID of the received e-mail; inputting content to the reply e-mail; sending and storing the reply e-mail.

The present invention further provides methods and apparatus for forwarding an e-mail in an e-mail system, said e-mail is referred as a forwarded e-mail, said forwarded e-mail contains a Global-ID. The method comprises the following steps: forwarding the e-mail by a user and creating a forwarding e-mail, the forwarded e-mail including a sender address and the forwarding e-mail including a recipient address; generating a Global-ID and designating the Global-ID to the forwarding e-mail; designating a Reply-to-ID to the forwarding e-mail, said Reply-to-ID corresponding to the Global-ID of the forwarded e-mail, if the sender of the forwarded e-mail is identical with said recipient address of the forwarding e-mail; inputting content to the forwarding e-mail by the user; and sending and storing the forwarding e-mail.

The present invention further provides methods and apparatus for browsing an e-mail in an e-mail system, the e-mail contains a Global-ID and a Reply-to-ID. The method comprises the following steps: opening and browsing the e-mail by a user; displaying the content of the e-mail to the user; fetching the Reply-to-ID of the e-mail; determining whether the fetched Reply-to-ID is null; retrieving an e-mail whose Global-ID corresponds to the fetched Reply-to-ID from the stored e-mail's; incorporating the content of the retrieved e-mail into the browsed e-mail; fetching the Reply-to-ID of the retrieved e-mail; repeating the steps of determining, retrieving, incorporating and fetching, until the fetched Reply-to-ID is null or the step of retrieving cannot find an e-mail whose Global-ID corresponds to the fetched Reply-to-ID.

The present invention also provides an e-mail client in an e-mail system, including an in-box repository, a sent repository, e-mail browsing means and e-mail editing means, said e-mail client further comprising: Global-ID generating means for generating a unique Global-ID for each e-mail, and designating said Global-ID to a new e-mail in said e-mail client means; Reply-to-ID designating means for designating a Reply-to-ID to each of the e-mail's in said e-mail editing means; e-mail retrieving means for retrieving an e-mail that has a corresponding Global-ID from repository; e-mail incorporating means for incorporating the e-mail into e-mail browsing means according to the retrieving result of e-mail retrieving means.

BRIEF DESCRIPTION OF THE SEVERAL VIEWS OF THE DRAWINGS

These and other aspects, features, and advantages of the present invention will become apparent upon further consideration of the following detailed description of the invention when read in conjunction with the drawing figures, in which.

TRANSLATION OF THE DRAWINGS

Figure 1:
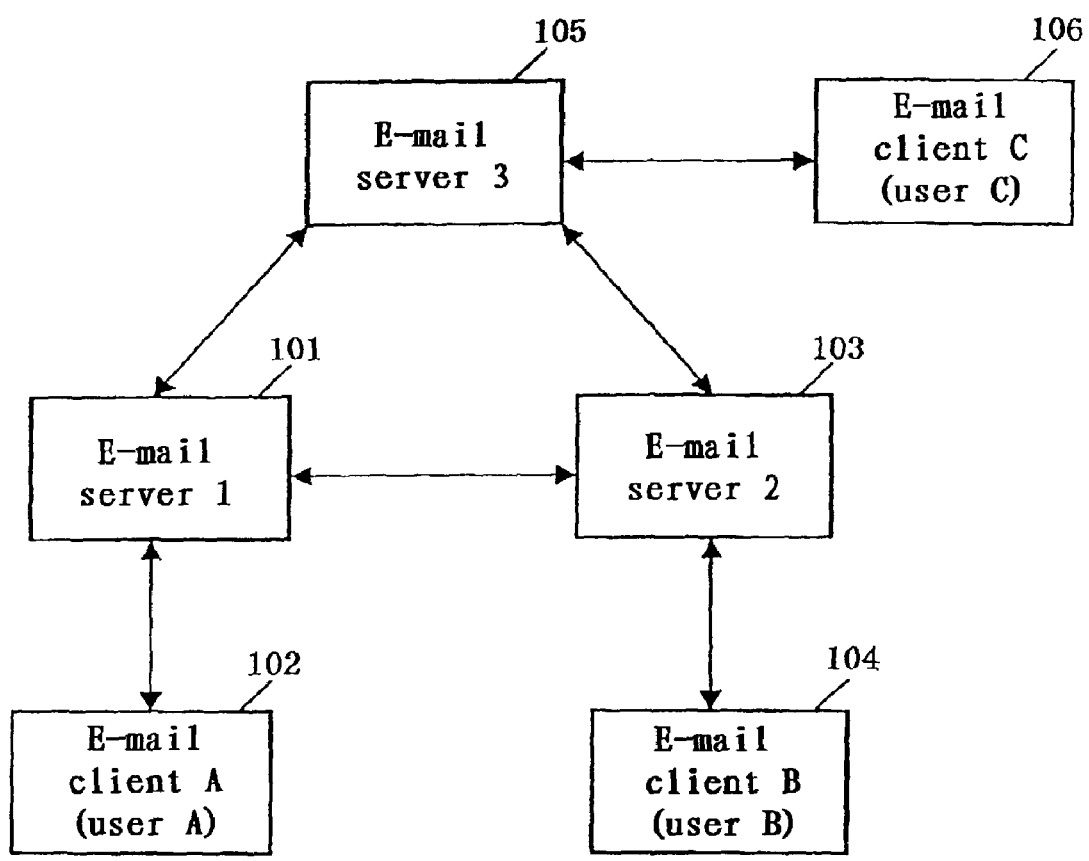
FIG. 1 illustrates the e-mail system according to the prior art.

FIG. 1
101. E-mail server 1
102. E-mail client A (user A)
103. E-mail server 2
104. E-mail client B (user B)
105. E-mail server 3
106. E-mail client C (user C)
FIG. 2
501. Protocol transportation means
505. E-mail receiving means
510. E-mail sending means
515. In-box repository
520. Sent repository
525. Sending repository
530. E-mail browsing means
535. E-mail editing means
FIG. 3.
A: Sent repository
B: In-box repository
A: In-box repository
B: Sent repository replying
FIG. 4
201. Composing a new e-mail by user
205. Generating a Global-ID and designating said Global-ID to said e-mail
210. Designating an expiration-time for said e-mail
215. Sending and storing said e-mail
FIG. 5
301. replying to a received e-mail by user
305. Generating a new Global-ID and designating it to a new reply e-mail
310. Designating a Reply-to-ID for the new reply e-mail, the Reply-to-ID corresponding to the Global-ID of the received e-mail
315. Designating an expiration-time for said new reply e-mail
320. Has current time exceeded the expiration-time of the received e-mail?
325. Incorporating the content of received e-mail into reply e-mail as "original message"
330. Setting the Reply-to-ID of the new replying e-mail as the Reply-to-ID of the received e-mail
335. Inputting content of the reply e-mail by user
340. Sending and storing said new reply e-mail
FIG. 6
401. Opening and browsing an e-mail.
405. Displaying the content of said e-mail to user
410. Fetching the Reply-to-ID of said e-mail
415. Said Reply-to-ID is null?
420. Retrieving an e-mail whose Global-ID corresponds to the Reply-to-ID from the stored e-mail's
425. Incorporating the content of the retrieved e-mail into the browsed e-mail as "original message"
430. Fetching the Reply-to-ID of the retrieved e-mail
FIG. 7
501. Protocol transportation means
505. E-mail receiving means
510. E-mail sending means
515. In-box repository
520. Sent repository
530. E-mail browsing means
535. E-mail editing means
540. E-mail retrieving means
545. E-mail incorporating means
550. Reply-to-ID designating means
555. Global-ID generating means
560. Expiration-time designating means
Abstract drawing
301. replying to a received e-mail by user
305. Generating a new Global-ID and designating it to a new reply e-mail
310. Designating a Reply-to-ID for the new reply e-mail, the Reply-to-ID corresponding to the Global-ID of the received e-mail
315. Designating an expiration-time for said new reply e-mail
320. Has current time exceeded the expiration-time of the received e-mail?
325. Incorporating the content of received e-mail into the reply e-mail as "original message"
330. Setting the Reply-to-ID of the new replying e-mail as the Reply-to-ID of the received e-mail
335. Inputting content of the reply e-mail by user
340. Sending and storing said the new reply e-mail

DETAILED DESCRIPTION

The present invention provides methods, systems and apparatus for browsing, composing, replying e-mail's and an e-mail client in an e-mail system to achieve the effect that a reply e-mail receiver can see the previous e-mail of the reply e-mail without attaching the previous e-mail to the reply e-mail. It provides methods and apparatus for composing a new e-mail in an e-mail system, comprising the following steps: composing a new e-mail by a user; generating a Global-ID and designating the Global-ID to the present e-mail; and sending and storing the e-mail. It further provides methods and apparatus for replying to a received e-mail in an e-mail system, said received e-mail contains a Global-ID, said method comprises the following steps: replying to a received e-mail by a user and creating a reply e-mail; generating a Global-ID and designating the Global-ID to the reply e-mail; designating a Reply-to-ID to the reply e-mail, said Reply-to-ID corresponding to the Global-ID of the received e-mail; inputting content to the reply e-mail; sending and storing the reply e-mail. It still further provides methods and apparatus for forwarding an e-mail in an e-mail system, said e-mail is referred as a forwarded e-mail, said forwarded e-mail contains a Global-ID. It also provides methods and apparatus for browsing an e-mail in an e-mail system, the e-mail contains a Global-ID and a Reply-to-ID. The present invention also provides an e-mail client in an e-mail system, including an in-box repository, a sent repository, e-mail browsing means and e-mail editing means.

FIG. 1 illustrates an e-mail system according to the prior art. An e-mail system usually comprises an e-mail server, an e-mail client and a network connection between them. As shown in this figure, users A, B and C browse, compose and send e-mail's via e-mail clients 102, 104 and 106, respectively; said e-mail clients 102, 104 and 106 are respectively connected to e-mail servers 101, 103 and 105; e-mail servers 101, 103 and 105 are connected with each other by the network for sending e-mail's to destination address via different routes. The e-mail's composed or replied by users with e-mail clients 102, 104 and 106 are sent to destination clients via e-mail servers 101, 103 and 105 according to specific communicating protocols, and then they are browsed by destination users.

Those skilled in the art should understand that a variety of e-mail systems could be used in the present invention. For example, the e-mail system may connect clients 102 and 104 to a single e-mail server, connect one client to several servers, implement a client and a server in one computer, or connect a client to different servers while sending and receiving. The e-mail system may use a variety of communicating protocols, such as SMPT, POP, HTTP, etc., and a variety of the format of e-mail. However, such variety will not affect the implementation of the present invention and the protecting scope of the present invention.

Figure 2:
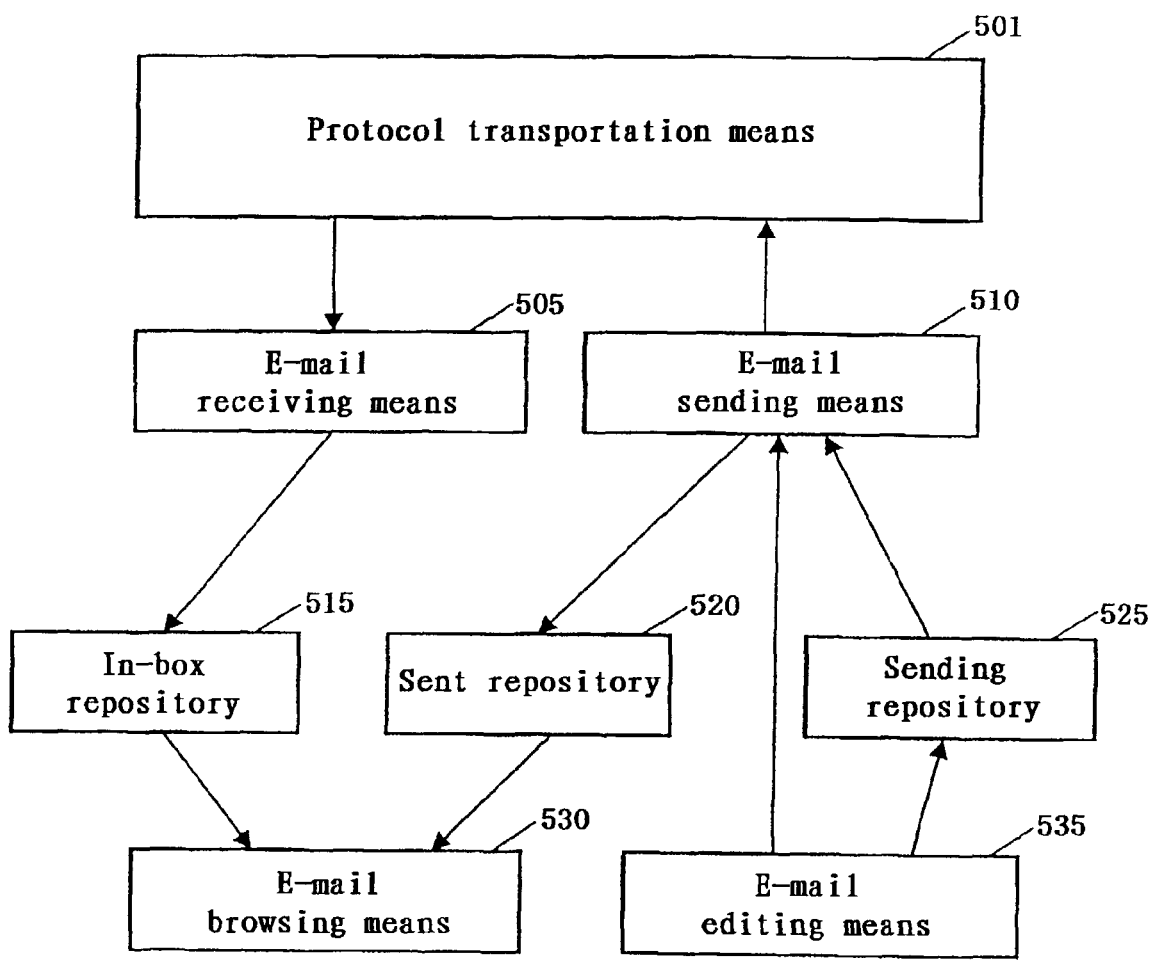
FIG. 2 illustrates the e-mail client in the e-mail system according to the prior art.

FIG. 2 illustrates a diagram of an e-mail system client according to the prior art, in which protocol transporting means 501 is used for setting up a communicating connection with an e-mail server. E-mail receiving means 505 is used for receiving the e-mail's sent from an e-mail server via the protocol transmitting means 501. An in-box repository 515 is used for storing the received e-mail's. E-mail browsing means 530 is used for displaying e-mail content to the receivers. E-mail editing means 535 is used for composing and modifying e-mail's. E-mail sending means 510 is used for sending out the composed e-mail's via protocol transporting means. A sent repository 520 is used for storing the sent e-mail's. A sending repository 525 is used for storing the composed but not-sent e-mail's.

Those skilled in the art should understand that an e-mail client as shown in FIG. 2 could be a computer or other computing means, for example, PDA, palmtop computer or other embedded means, and may be implemented by software or firmware, or implemented in web server or browser in WWW form. Furthermore, the e-mail client can be varied. For example, said e-mail client may comprise a draft repository for storing unfinished e-mail's or those unexpected to be sent out for the moment; an e-mail deleting repository for storing the e-mail deleted by users; an address book for storing the information of contacts, etc. Furthermore, said e-mail client may omit the sending repository 525. However, such variety will not affect the implementation of the present invention and the protecting scope of the present invention.

Figure 3:
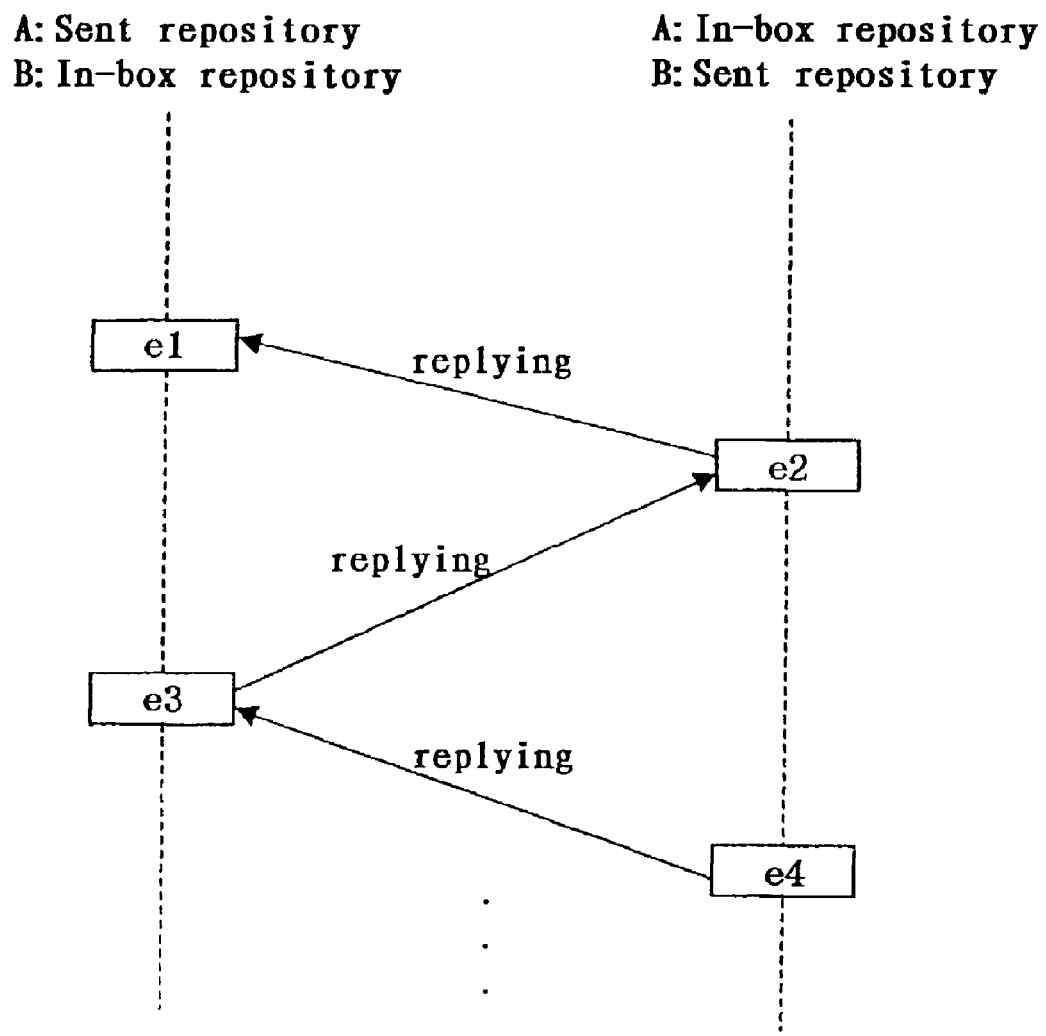
FIG. 3 illustrates the e-mail reply-chain according to the prior art.

FIG. 3 illustrates an e-mail reply-chain. As shown, the dashed line on the left represents the sent repository of user A (client A 102) and the in-box repository of user B (client B 104); and the dashed line on the right represents the in-box repository of user A (client A 102) and the sent repository of user B (client B 104). Firstly, e-mail e1 is sent to user B from user A, and user B replies an e-mail e2 to user A corresponding to e-mail e1, and then user A replies an e-mail e3 to user B corresponding to e-mail e2 and an e-mail e4 is replied corresponding to e-mail e3, and so on. Similarly, there are e-mail's e5, e6 . . . . As can be seen from FIG. 2, all the e-mail's in the e-mail reply-chain are stored in the repository of both clients A and B. However, according to the prior art, e-mail e2 contains all the content of e-mail e1, e-mail e3 contains all the content of e-mail e2, and e-mail e4 contains all the content of e-mail e3, and so on. Obviously, some information is repeatedly stored and transported in the reply-chain. The present invention is to avoid such kind of repeat and the waste thus resulted.

Figure 4:
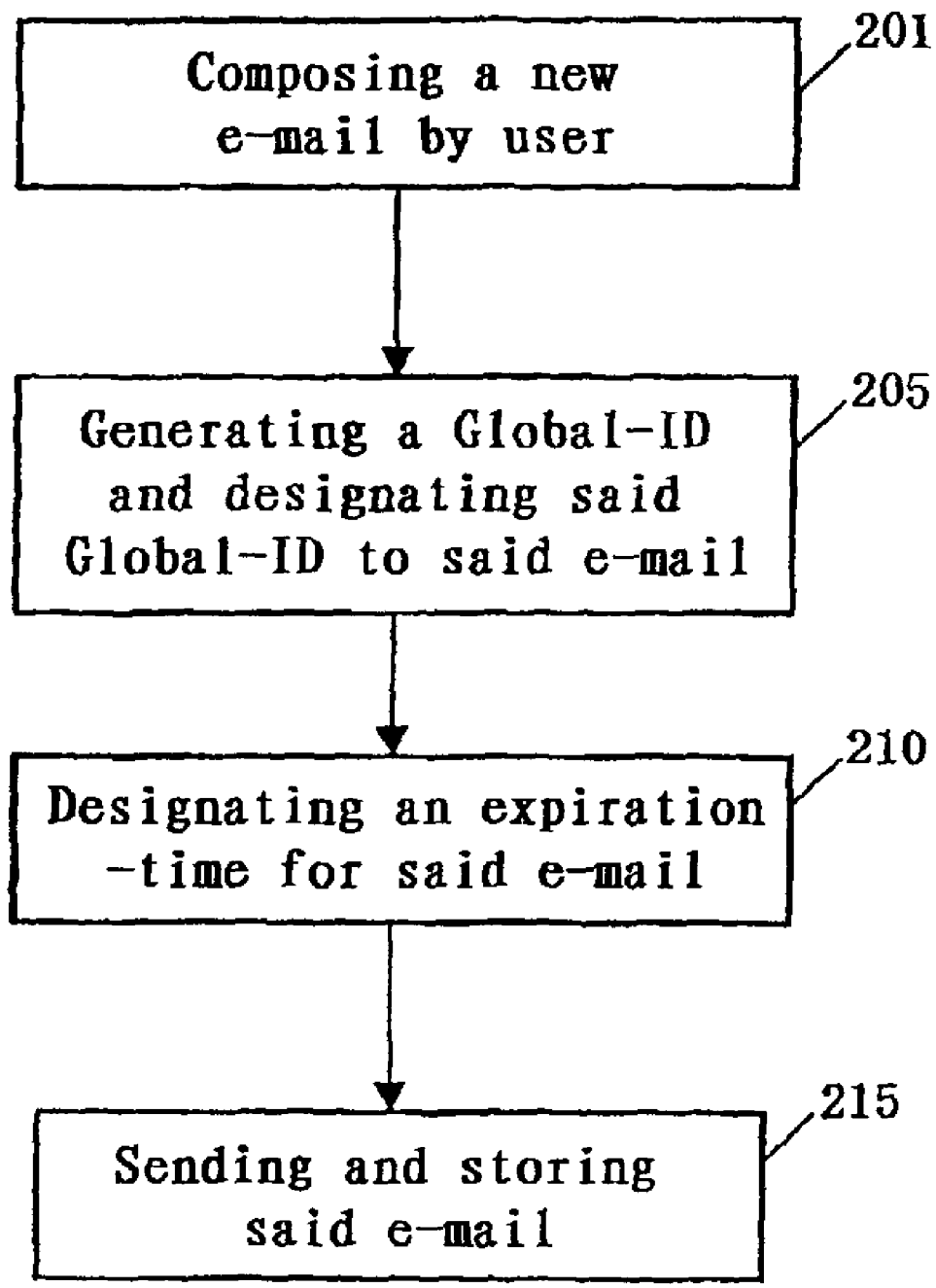
FIG. 4 illustrates a flow chart of a method for composing e-mail's according to an embodiment of the present invention.

FIG. 4 is a flow chart of a method for composing an e-mail according to an embodiment of the present invention. Firstly, a user composes a new e-mail at step 201. Then, a Global-ID is generated and designated to the new e-mail composed by user at step 205. In the present invention, Global-ID and the under-mentioned Reply-to-ID is the only identifier for identifying an e-mail. A variety of methods can be used to generate such kind of unique identifier. For example, Standard ISO 11578 issued by International Organization for Standardization has defined a method for generating UUID (universal unique identifier). An Expiration-Time is designated to said e-mail at step 210. Since the e-mail's stored in repository may not be stored permanently in e-mail client, they may be deleted by the system after a period of time. And such time period is the Time To Live (TTL) of repository. The TTL of repository is defined by users in some e-mail systems and may be different in different e-mail clients. Therefore, in the present invention, in order to record the storing time of an e-mail in the repository, an Expiration-Time is designated to each e-mail, and the value of the Expiration-Time is the sum of the current time and the TTL. Finally, at step 215, said e-mail is sent and stored.

An e-mail consists of a header and a body. A list of attribute-value (A/V) pairs are defined in the header. For example, an Internet e-mail header format defined by [RFC 822] not only defines standard A/V pairs but also defines how to add user-defined A/V pairs to the header. Therefore, in a preferred embodiment of the present invention, Global-ID, Expiration-Time and under-mentioned Reply-to-ID are defined on the header. In this way, the body of an e-mail (e.g. defined by MIME format) will not be affected. Certainly, the variety of e-mail format will not affect the scope of the present invention.

Figure 5:
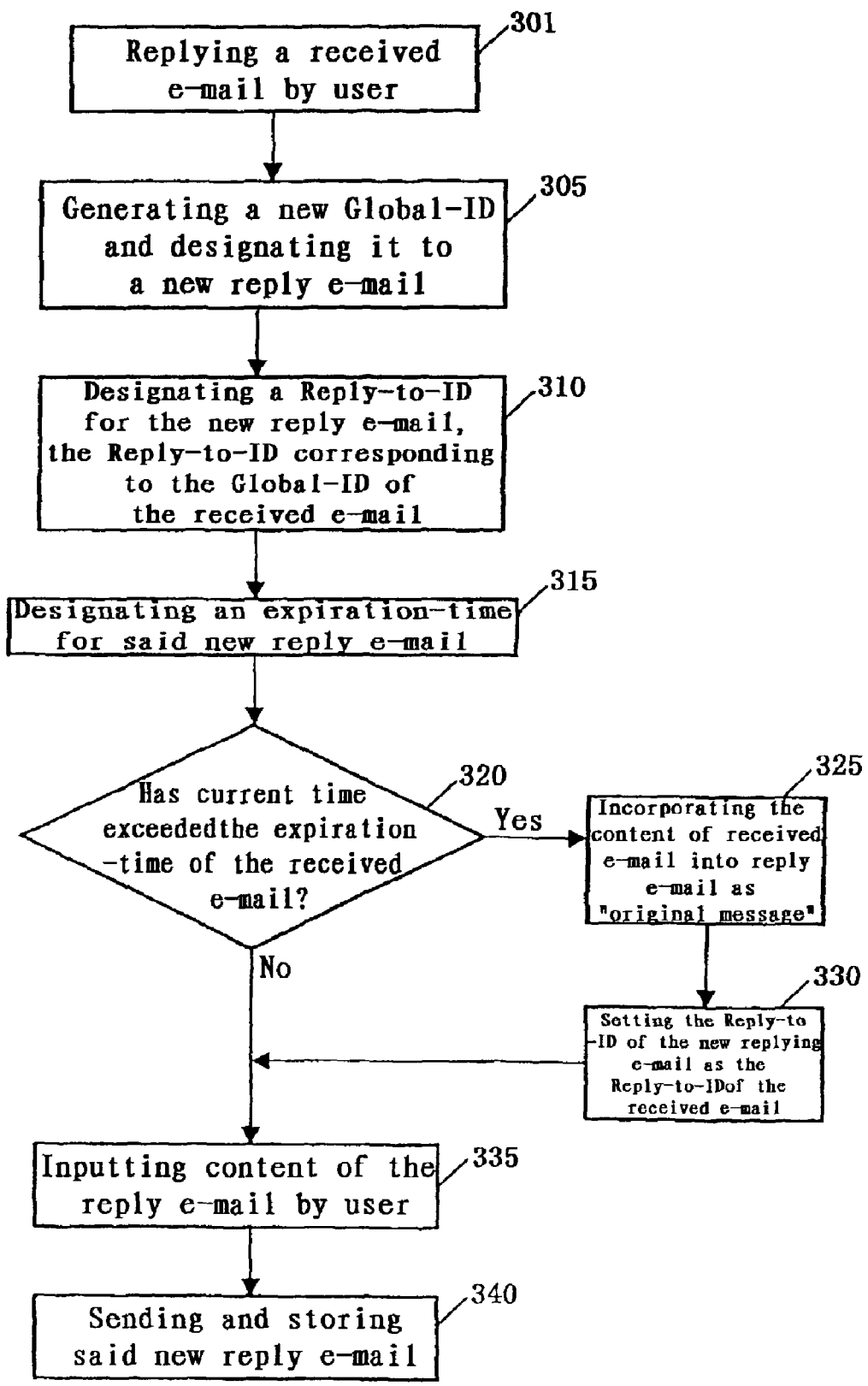
FIG. 5 illustrates a flow chart of a method for replying e-mail's according to an embodiment of the present invention.

FIG. 5 illustrates a flow chart of a method for replying e-mail according to an embodiment of the present invention. Firstly, a user replies a received e-mail at step 301, thereby starting the procedure. At step 305, a new Global-ID is generated and designated to a new reply e-mail. At step 310, a Reply-to-ID is designated to said new reply e-mail, and the value of said Reply-to ID corresponds to the Global-ID of the received e-mail. At step 315, an Expiration-Time is designated to the new received e-mail. Accordingly, the value of Expiration-Time is equal to the current time plus the TTL of repository. Then step 320 determines whether current time has exceeded the expiration-time of the received e-mail. If the result is "NO", the procedure processes to the step 335, inputting the content of the reply e-mail by user. If the judgment of step 320 is "YES", the program processes to the step 325, incorporating the content of received e-mail into the new reply e-mail as the "original message". At step 330, the Reply-to-ID of the new reply e-mail is set as the Reply-to-ID of the received e-mail, and then turning to step 335.

In some existing e-mail systems, it is possible for users to set different TTL to different repositories. Therefore, the expiration time of a new e-mail is equal to the current time plus the TTL of the repository which stores said e-mail, such as, the TTL of the sent repository.

Figure 6:
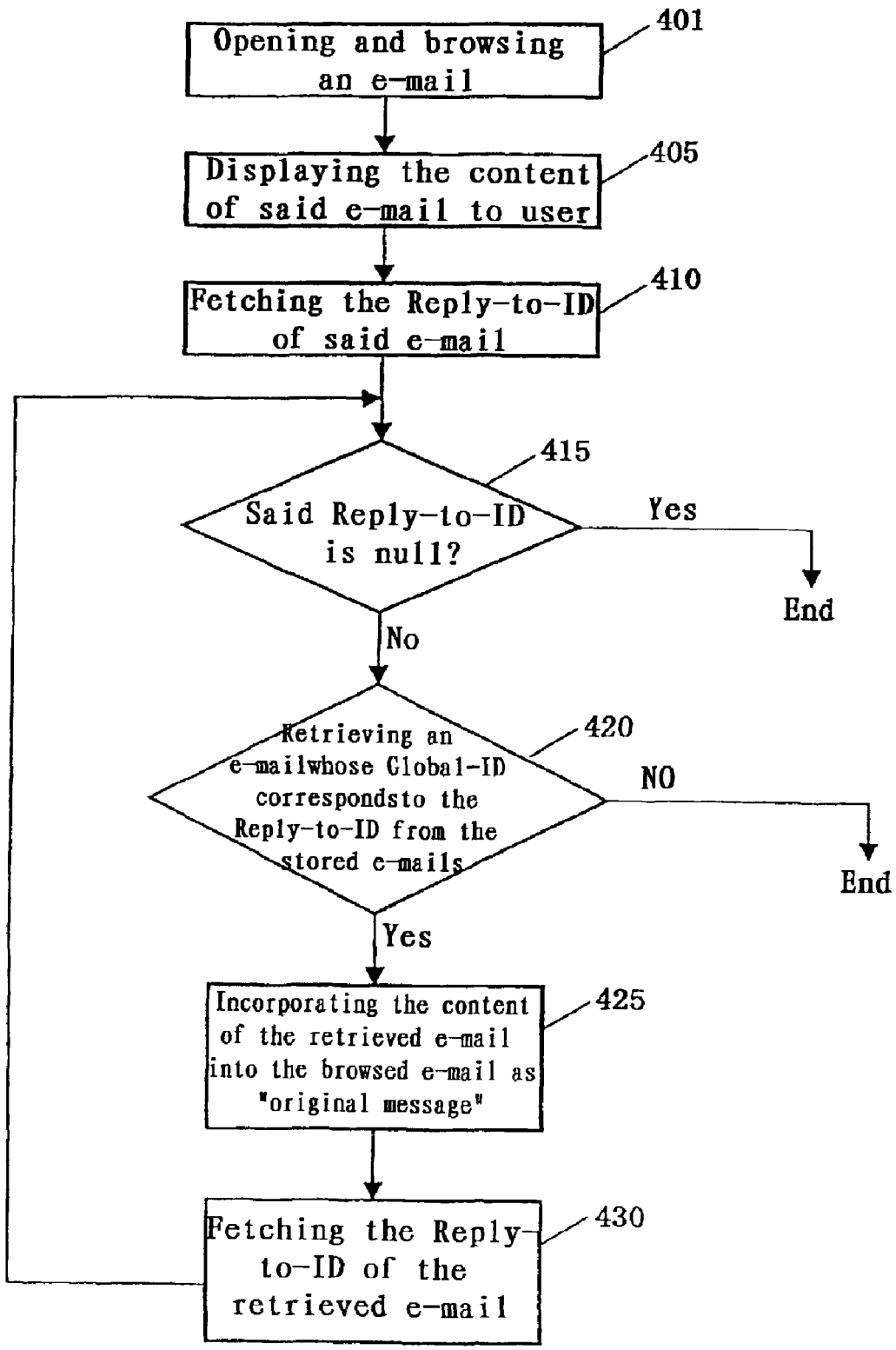
FIG. 6 illustrates a flow chart of a method for browsing e-mail's according to an embodiment of the present invention.

FIG. 6 illustrates a flow chart of a method for browsing an e-mail according to an embodiment of the present invention. Firstly, a user opens and browses an e-mail at step 401. At step 405, the content of said e-mail is displayed to the user. At step 410, the Reply-to-ID of said e-mail is fetched. Then, step 415 determines whether the fetched Reply-to-ID is null. If "YES", the procedure is terminated. Otherwise, the procedure processes to step 420. Step 420 retrieves an e-mail, whose Global-ID corresponds to the fetched Reply-to-ID, among the e-mail's stored in repository. If there is not such e-mail, the procedure is terminated. If there is such e-mail, the procedure processes to step 425. At step 425, the content of retrieved e-mail is incorporated into the browsed e-mail as "original message". Then, the step 430, fetching the Replyto-ID of retrieved e-mail and as shown, returning to the step 415 to determine the fetched Reply-to-ID. Repeating until the fetched Reply-to-ID is null or the step of retrieving cannot find an e-mail whose Global-ID corresponds to the fetched Reply-to-ID.

Figure 7:
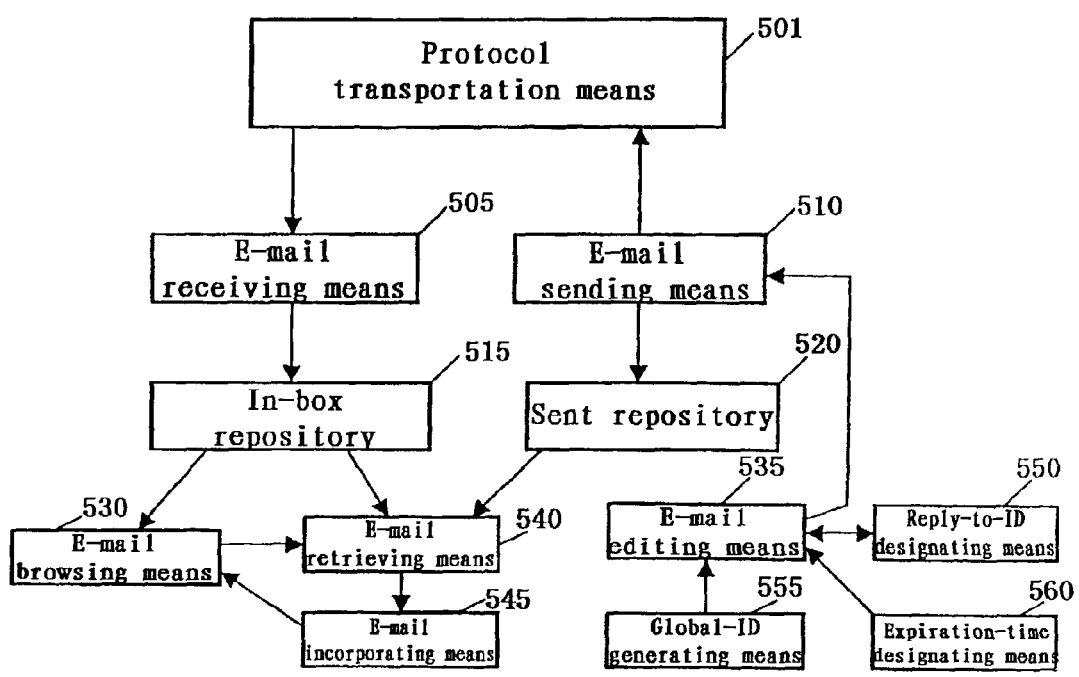
FIG. 7 illustrates an e-mail client according to an embodiment of the present invention.

Besides the aforementioned method, the present invention further provides an e-mail client for implementing the method. FIG. 7 illustrates a diagram of the e-mail client according to an embodiment of the present invention. Wherein, said e-mail client comprises the components of the prior e-mail client as shown in FIG. 2, such as protocol transportation means 501, e-mail receiving means 505, e-mail sending means 510, an in-box repository 515, an sent repository 520, an e-mail browsing means 530, e-mail editing means 535, etc. In addition, it also comprises e-mail retrieving means 540 for retrieving e-mail's (called retrieved e-mail's) that have corresponding Global-IDs from repository according to the Reply-to-IDs of the browsed e-mail's in e-mail browsing means 530; e-mail incorporating means 545 for incorporating the corresponding retrieved e-mail's into the e-mail browsing means 530 according to the retrieving result of the e-mail retrieving means 540; Global-ID generating means 555 for generating a unique Global-ID that can identify an e-mail, and designating said Global-ID to the edited new e-mail in e-mail editing means 535, the generating method of Global-ID has been described above; expiration-time designating means 560 for computing the expiration-time of each of the edited new e-mail's in e-mail editing means 535 according to the current time and the TTL of the repository, and designating the expiration-time to said e-mail; Reply-to-ID designating means 550 for designating a Reply-to-ID to said e-mail so as to match the Global-ID of the received e-mail, if the edited new e-mail in the e-mail editing means 535 is a reply e-mail. In addition, according to an embodiment of the present invention, if current time has exceeded the expiration-time of the received e-mail, the Reply-to-ID designating means 550 sets the Reply-to-ID of edited new e-mail in e-mail editing means 535 to the Reply-to-ID of the corresponding received e-mail, and copies the content of the received e-mail into the new e-mail as part of the "original message".

Concerning a more complicated case, that is the case of carbon coping (CC, BCC) and forwarding e-mail. Provided that user A sends e-mail e1 to user B; while generating a new e-mail e2 to reply to e-mail e1, B further carbon copies the e-mail e2 to user C (that is, generating another e-mail e2'). In that case, the content of e-mail e1 contained in the reply e-mail e2 is replaced by a Reply-to-ID; and e-mail e2' is requested to contain all the content of e-mail e1, because e-mail e1 has not been stored in the client repository of user C. If user C forwards the e-mail to user D and generates a forwarding e-mail, likewise, the forwarding e-mail is required to include the original e-mail's. In fact, in the present invention, as long as the recipient address of said new e-mail is identical with the sender address of the original e-mail, the e-mail client will set the Reply-to-ID of said new e-mail corresponding to the Global-ID of the original e-mail, as the aforementioned "reply", and not to include the content of the original e-mail, regardless replying, forwarding or CC/BCC-ing.

Due to the embodiments above, by means of replying e-mail in the present invention, the e-mail content stored in repository does not have to be sent or stored, repeatedly.

Although the invention has been described with respect to some specific embodiment, it will be understood by those skilled in the art that various changes may be made without depart from the spirit and scope of this invention. Therefore, these embodiments cannot be used as the limit to the present invention. The scope of the present invention are defined by the claims.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A method of browsing a browsed e-mail in an e-mail system, said e-mail including a Global-ID and a Reply-to-ID, comprising:

opening and browsing the browsed e-mail with a computing device, the email including an expiration time;

displaying the content of the browsed e-mail to a user;

fetching with the computing device the Reply-to-ID of the browsed e-mail;

determining whether the fetched Reply-to-ID is null;

retrieving an e-mail whose Global-ID corresponds to the fetched Reply-to-ID from stored e-mail's;

determining that the expiration time has not passed;

after determining that the expiration has not passed, incorporating the content of the retrieved e-mail into the browsed e-mail;

fetching the Reply-to-ID of the retrieved e-mail; and repeating the steps of determining, retrieving, incorporating and fetching, until the fetched Reply-to-ID is null or the step of retrieving cannot find an e-mail whose Global-ID corresponds to the fetched Reply-to-ID.

2. An article of manufacture comprising non-transitory storage media storing program code for causing browsing e-mail, the computer readable program code means in said article of manufacture comprising computer readable program code means for causing a computer to effect the steps of claim 1.

* * * * *